UNITED STATES PATENT OFFICE.

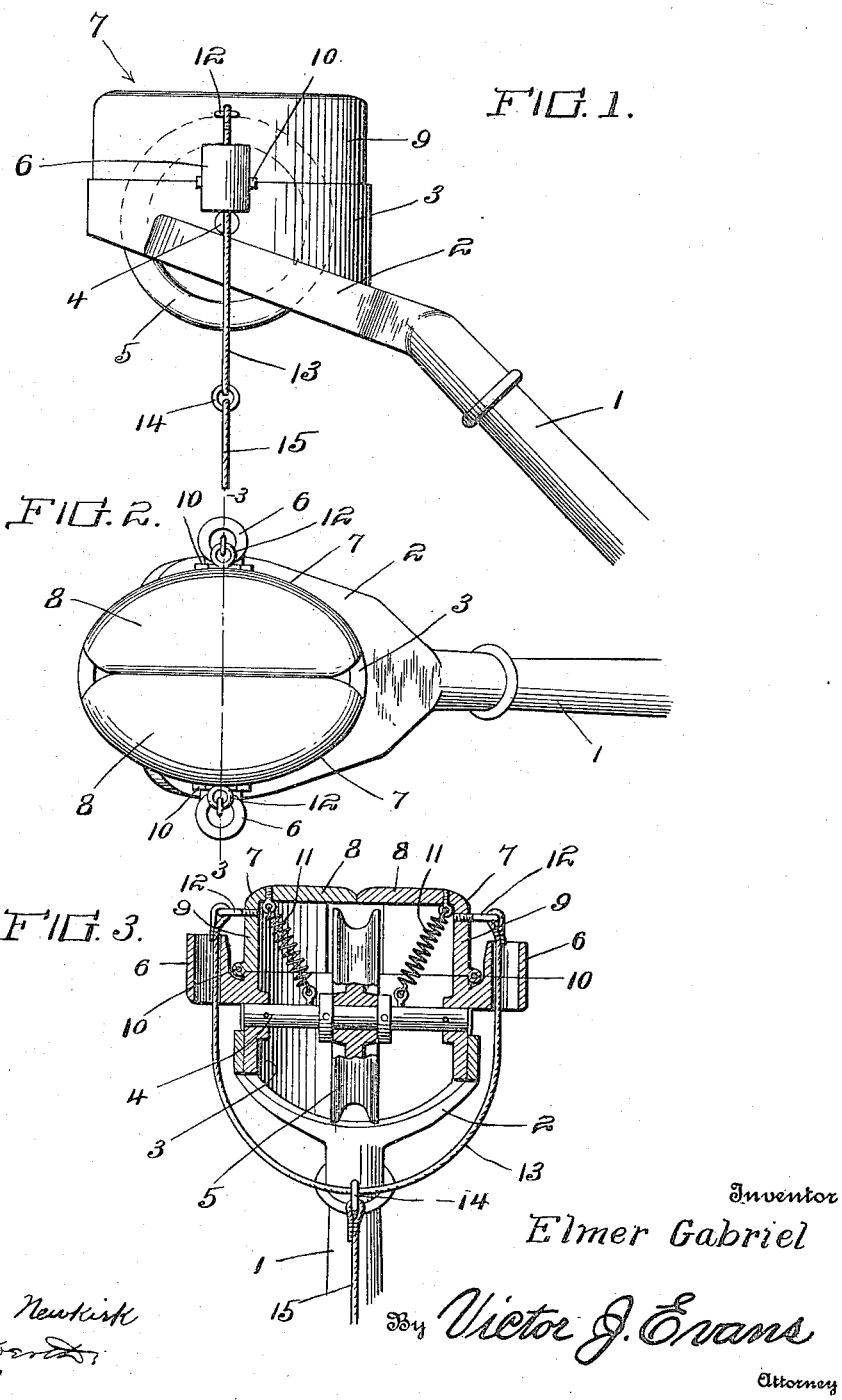

ELMER GABRIEL, OF ATHENS, OHIO.

TROLLEY-WHEEL.

1,226,501.  Specification of Letters Patent.  Patented May 15, 1917.

Application filed June 30, 1916. Serial No. 106,943.

*To all whom it may concern:*

Be it known that I, ELMER GABRIEL, a citizen of the United States, residing at Athens, in the county of Athens and State of Ohio, have invented new and useful Improvements in Trolley-Wheels, of which the following is a specification.

This invention relates to improvements in the construction of trolley poles, and an object of the invention is to provide a novel mounting for the trolley wheel whereby the same may be inclosed and positively held in engagement with the wire.

In carrying out the present invention it is my purpose to arrange upon the harp end of a trolley pole a substantially elliptical ring or flange member between the sides of which the trolley wheel is journaled and to hingedly secure upon the said ring or flange guard members in the nature of hoods which are normally held in closing position to hold the wheel to the wire, but which hoods will readily spread when passing a hanger or support so that the wheel may travel the wire with ease and facility.

It is also my purpose to produce a trolley wheel guard which will normally overlie the trolley wire and hold the wheel against jumping the wire and which may be readily and conveniently manipulated to inactive position so that the trolley pole may be subsequently lowered.

A further object of the invention is to construct a trolley pole and guard which will embrace the desired features of simplicity, efficiency and durability, and which may be manufactured, installed and maintained at a minimum expense.

With the above and other objects in view the improvement resides in the construction, combination and arrangement of parts set forth in the following specification and falling within the scope of the appended claim.

In the drawing:
Figure 1 is a side elevation of a trolley harp having guards thereon, all constructed in accordance with the present invention, Fig. 2 is a top plan view of the same, and Fig. 3 is a transverse sectional view approximately on the line 3—3 of Fig. 2.

Referring now to the drawing in detail, the numeral 1 designates the upper portion of the trolley pole which may be formed with the usual trolley harp 2, the inner sides of the harp, in the present instance, being of an elliptical formation to embrace the opposite sides of an elliptical flange 3. The axle 4 for the trolley wheel 5 is mounted in suitable journals in the side of the flanged head 3 of the trolley pole, and the sides of the flanged head 3 are provided with elongated lugs 6 which may project above the upper edge of the flanged head 3 and the said lugs are provided with longitudinal openings.

The guard comprises two substantially similarly constructed members 7—7 which have their sides elliptical, conforming to the sides of the flanged head 3 and which have their upper edges flanged, as at 8, the said flanges extending beyond the ends of the sides 9 of the said guards. These sides 9 are each centrally hinged to the opposite sides of the flanged head 3, as indicated by the numerals 10 and the said hinges are disposed inward of the upwardly extending ends of the lugs 6, and the inner faces of the said extensions of the lugs are inclined or beveled away from the sides of the flanged head 3 of the trolley pole so that the guard members 7 will be limited in their outward swinging movement. The top 8 of the guards, at the opposite ends thereof, is rounded outwardly to provide a flared mouth or passage between the meeting edges of the said guards, and the top of each of the said guards, upon the inner side thereof, has secured thereto a spring 11, the opposite end of the said spring being connected either to the axle 4 or to a suitable lug upon the inner sides of the flanged head 3. The numerals 12 designate eye members which are arranged one upon each of the guards 7 and connected to the said eyes are the opposite ends of a substantially U-shaped bail 13, the arms of the said bail passing through the openings in the lugs 6. The bail is, of course, constructed of some flexible material, and is centrally provided with an eye member 14 to which is secured the upper end of the trolley rope 15.

From the above description taken in connection with the drawing, the construction, mode of operation and manner of employing my improvement will be readily apparent. While the trolley wheel 5 is in engagement with the wire, the guard members 7—7 are normally held in a closed position by the springs 11—11 so that the confronting edges of the same will contact or nearly contact. When the trolley wheel passes a support or hanger, the flared entrance mouth provided between the guards 7—7 will receive the hanger, permitting the guard members to swing outwardly in opposite directions upon their hinges 10 and through the medium of the springs 11 be returned to their initial position after passing the said hanger. When it is desired to lower the trolley a pull is exerted upon the cord 15 and from thence to the bail 13 which will cause the guard members to swing outwardly and the limit of such movement will be limited by the contact of the guards with the projecting ends of the lugs 6. In the continued pulling of the trolley cord the pole is lowered and the wheel disengaged from the wire as will be apparent.

Having thus described the invention, what I claim is:

In a device for the purpose set forth, the combination with a trolley pole, of a ring member formed on the fork thereof and centrally provided with oppositely disposed upwardly extending lugs, each of said lugs having a central opening, an axle journaled transversely in the ring below the lugs, a trolley wheel upon the axle, guards comprising two substantially similar members having side flanges and each of said members being pivotally connected to the ring opposite the respective lugs on the ring, spring means between the sections of the guard and the axle for normally bringing the confronting edges of the guard members into engagement, and a flexible bail passing through the openings in the lugs and connected with the guards, and a trolley rope connected with the bail.

In testimony whereof I affix my signature.

ELMER GABRIEL.

Copies of this patent may be obtained for five cents each, by addressing the "Commissioner of Patents, Washington, D. C."